(12) United States Patent
Ng

(10) Patent No.: US 6,235,420 B1
(45) Date of Patent: May 22, 2001

(54) HOT SWAPPABLE BATTERY HOLDER

(75) Inventor: Richard Ng, Centreville, VA (US)

(73) Assignee: Xybernaut Corporation, Fairfax, VA (US)

( * ) Notice: Subject to any disclaimer, the term of this patent is extended or adjusted under 35 U.S.C. 154(b) by 0 days.

(21) Appl. No.: 09/457,831

(22) Filed: Dec. 9, 1999

(51) Int. Cl.[7] .................................................... H01M 2/10
(52) U.S. Cl. .............................. 429/96; 429/99; 429/100; 439/500
(58) Field of Search ........................ 429/96–100; 439/500

(56) References Cited

U.S. PATENT DOCUMENTS

| | | | | |
|---|---|---|---|---|
| 4,731,306 | * | 3/1988 | Dumbser | 429/98 |
| 5,369,802 | * | 11/1994 | Murray | 455/351 |
| 5,863,218 | * | 1/1999 | Quat et al. | 439/500 |
| 6,042,962 | * | 3/2000 | Ling | 429/99 |
| 6,045,398 | * | 4/2000 | Narita et al. | 439/500 |

\* cited by examiner

*Primary Examiner*—Gabrielle Brouillette
*Assistant Examiner*—Tracy Dove
(74) *Attorney, Agent, or Firm*—James J. Ralabate

(57) ABSTRACT

This is a battery holder that is made up of two compartments, each compartment will house half of the battery. In other words, it takes the two compartments to make up the full battery housing. Each compartment is movably connected to the other so that the housing can be easily opened when adding or removing a battery.

13 Claims, 2 Drawing Sheets

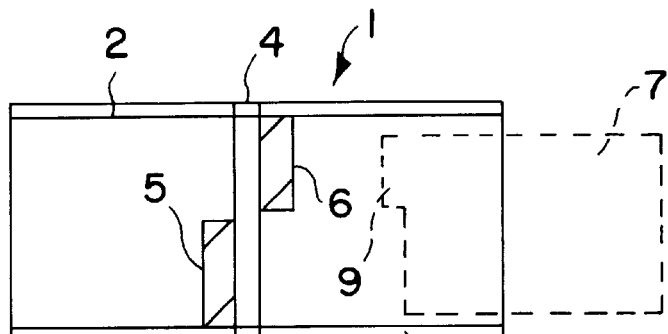
FIG. 1
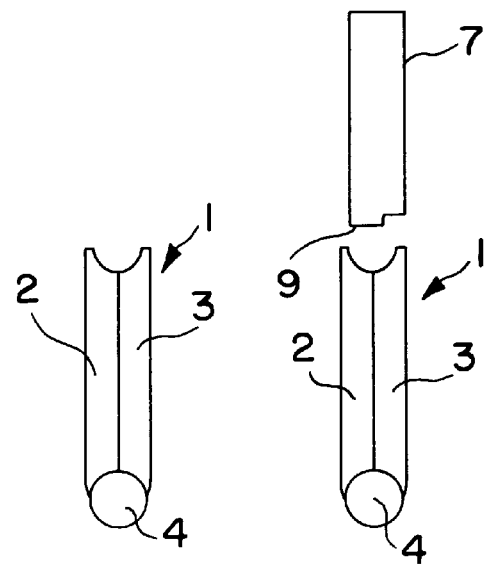
FIG. 2A    FIG. 2B
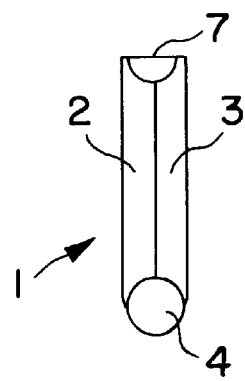 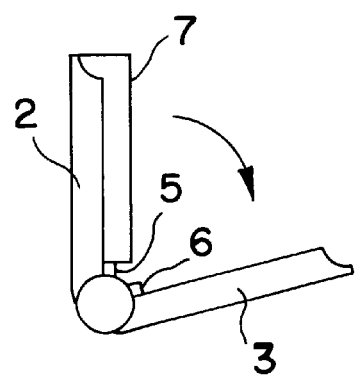
FIG. 2C    FIG. 2D

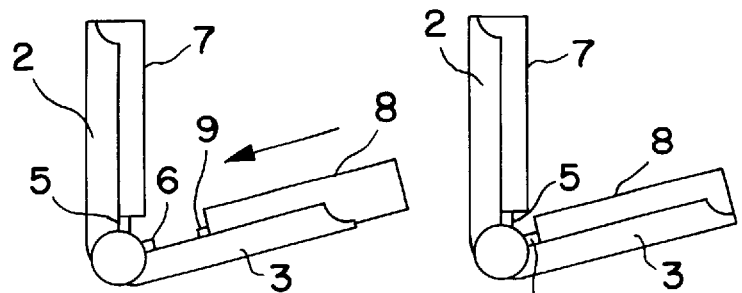
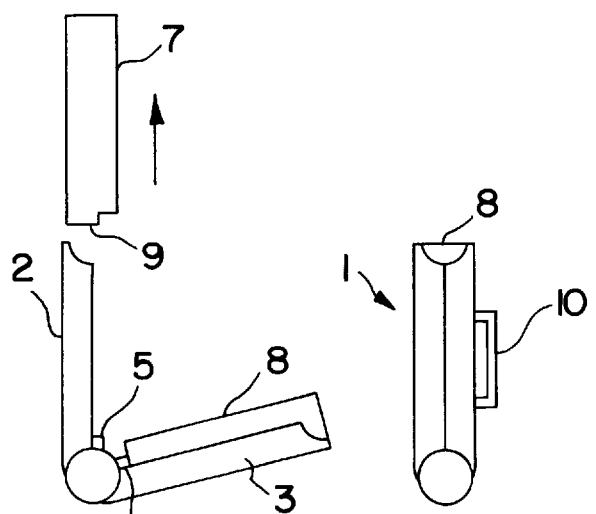
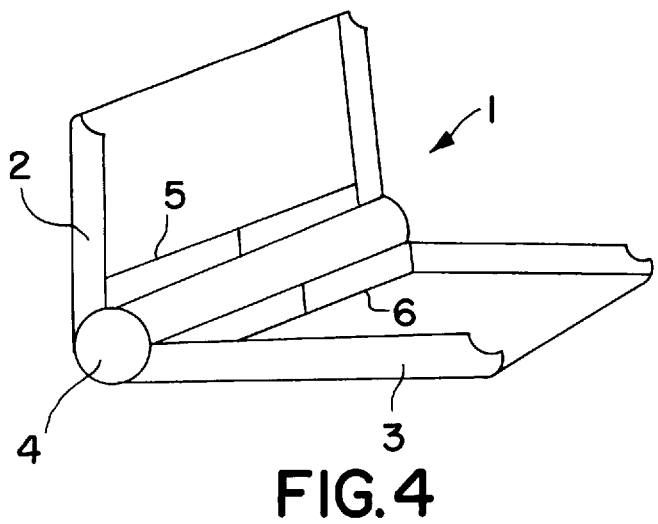

HOT SWAPPABLE BATTERY HOLDER

This invention relates to a battery holder and, more specifically, to a novel battery holder that is particularly adapted for use in mobile computers.

BACKGROUND OF THE INVENTION

It is known to use various types of mobile computers where a source of energy is required such as electrical or battery power. A popular system that is now in use is the Mobile Assistant®, which is a voice activated hands-free wearable computer. The Mobile Assistant® is a product of Xybernaut Corporation of Fairfax, Va. A feature of the Mobile Assistant® is that it permits the user to have freedom to use his or her hands for repairing or other functions while using a fully functional computer. While, for clarity's sake, the present battery holder will be described in reference to a wearable computer, it is obvious that the holder of the present invention can be used in any desirable situation where a battery is used and in particular situations where continuous uninterrupted power is highly desirable.

U.S. Pat. No. 5,305,244 (Newman et al. I) describes the details of the Mobile Assistant® and fully discloses the components and function of such user-supported computers. Also, Newman et al. II, U.S. Pat. No. 5,844,824 describes and claims further improvements and modifications to the Mobile Assistant®. Both U.S. Pat. No. 5,305,244 and U.S. Pat. No. 5,844,824 are owned by the assignee of the present application.

Also disclosing wearable computers that require batteries are U.S. Pat. No. 5,285,398 (Janik I) and U.S. Pat. No. 5,491,651 (Janik II). Both of these patents disclose a belt computer containing the elements or components of a computer. In Janik I the plurality of computing elements are located on the belt and a flexible signal relaying means connects all of the elements for computing. A protective covering is used for enclosing said computer elements. In Janik II, a similar belt computer is described and claimed in which the signal relaying means, the length of which between any two computing elements, is greater than the length of the wearable number between any two computing elements. In both Janik I and Janik II, the flexible wearable computer is in the form of a belt comprising around its periphery sequentially positioned computer elements.

In both Newman, et al I and II and Janik I and II, a body-worn computer is disclosed that has utility only as a body-worn mobile computer. It is important in both systems to have an uninterrupted power source.

The current technology for laptop and mobile computers is two battery holders to swap batteries and prevents shutting down of the system. In a wearable system, every additional ounce of weight is significant to the user. An assembly line inspector, for example, wearing a computer for eight hours a day would welcome any reduction in weight. Using the holders of the prior art containing two relatively heavy batteries is one area where significant weight reduction can be affected by the present one-battery holder. Using only one battery while at the same time not shutting down the system would be a substantial advance in the art.

SUMMARY OF THE INVENTION

It is therefore an object of this invention to provide a battery holder devoid of the above-noted disadvantages.

Another object of this invention is to provide a battery holder which is substantially lighter in weight when in use than are presently-used holders.

A further object of this invention is to provide a simple uncomplicated battery holder structure that is easy to use and convenient to wear.

A still further object of this invention is to provide a one-battery holder rather than a holder requiring carrying two batteries or two separate holders each carrying a separate battery.

Another still further object of this invention is to provide a battery holder that can be easily used by a user requiring hands-free operation of a wearable computer.

Yet a further object of this invention is to provide a structure easily worn around the waist or torso of a user but can also be easily located in a pocket or other support of a user.

Other objects will become apparent upon a further reading of this disclosure.

The above objects and others are accomplished, generally speaking, by a battery holder that houses only one battery but which has two battery connectors, one which is a 180° turn from the other connector. The two-piece battery housing opens like a book and has a hinge means connecting each piece or compartment of the twopiece housing. By "hinge" or "hinge means" in the disclosure and claims is meant any means that permit one compartment to move relative to the adjacent compartment. When the first used battery level is low, the flap or piece is opened, the new charged battery is inserted which makes contact with the battery connector and then the old battery is removed. This provides uninterrupted battery power to the system while, at the same time, lessening the battery weight to be carried or supported. Batteries obtained from Molicel, Inc. and identified as model number ME202BB are typical batteries that can be used in the battery holder of the present invention. The battery holder of this invention is connected in the computer system as described in U.S. Pat. Nos. 5,304,244; 5,844,824; 5,285,398 and 5,491,651 all of which are incorporated by reference into the present disclosure. The fact that a new charged battery can be inserted into the holder without interrupting the power is critical to the present invention. This is accomplished by the use of a two-battery connector system where one connector is 180° from the other. The structure of the present invention will be further clarified in reference to the below description of the drawing. dr

BRIEF DESCRIPTION OF THE DRAWING

FIG. 1 is a top plan view of the battery holder of this invention showing the location of the two-battery connectors.

FIG. 2A is a side plan view of the closed empty battery connector of this invention.

FIG. 2B is a side plan view of the closed empty battery connector of this invention when a battery is about to be inserted therein.

FIG. 2C is a side plan view of the closed battery connector of this invention with a battery inserted therein.

FIG. 2D is a side plan view of the opened battery connector of this invention with a battery inserted therein showing the contact of the battery with one connector.

FIG. 3A is a side plan view of the opened battery holder having two batteries inserted therein, one to be removed and one to be inserted and retained therein.

FIG. 3B is a side plan view of the opened battery holder of this invention with two batteries therein, one which will be removed and one which will be retained therein.

FIG. 3C is a side plan view of the opened battery holder of this invention with one battery being removed and one retained battery in contact with the connector.

FIG. 3D is a side plan view of the closed battery holder of this invention after the used battery has been removed and the newly-charged battery is housed therein.

FIG. 4 is a perspective view of the empty opened battery holder of this invention showing the location of the battery connectors.

DESCRIPTION OF THE DRAWINGS AND PREFERRED EMBODIMENTS

In FIG. 1 the opened battery holder 1 is shown having two complemental compartments 2 and 3 which make up or form the whole battery housing when the holder is closed (as in 2A). Each compartment 2 and 3 has at an internal terminal end closest to hinge 4 a battery connector 5 and 6. The battery connectors 5 and 6 are positioned 180° from each other when holder 1 is in the opened position (as shown in FIG. 1). The used battery 7 is removed while the holder 1 is open as in FIGS. 3A–D after new and charged battery 8 is inserted into the complemental compartment 3. Both insertion of the new battery 8 and the removal of exhausted battery 7 are accomplished when the holder 1 is opened as in FIGS. 1 and 3A–D. It would be impossible to insert the new battery 8 while the holder 1 is closed because used battery 7 is occupying that space. In other words, compartment 2 makes up one-half of the housing and compartment 3 the other half of the housing. As shown in FIG. 2D, battery 7 which was first put into holder 1 is used up and ready to be removed from the housing but before this is done and to avoid interrupting the power supply, new battery 8 is inserted as in FIG. 3A and 3B before used battery 7 is removed. Once old battery 7 is removed and new battery 8 inserted, holder 1 can be closed as shown in FIG. 3D and new battery 8 is ready for use. The ability for continuous battery power is provided by the double battery connectors 5 and 6, one for battery 7 and one for battery 8. In FIG. 1, battery 7 which is the first battery to be inserted into compartment 3 and holder 1 is shown in dotted lines. Note that battery 7 will make contact with battery connector 6 in FIG. 1 whereas FIG. 2D shows first battery 7 in contact with battery connector 5. Thus, first battery 7 can be put in contact with either battery connector 5 or 6. As is the case with new battery 8, either connector can be used depending upon the location of the positive pole or anodes 9 of the batteries.

The important sequence to provide uninterrupted power is to insert a new battery into compartment 3 to make contact with battery connector 6 (as in FIG. 3A) and then remove old battery 7 (as in FIG. 3C). Next, close the holder so compartments 2 and 3 meet (FIG. 3D) and the uninterrupted supply of power is provided for the item being power supplied. In FIG. 3D, an attachment means 10 for attachment to the belt of a user is shown.

In FIG. 4, the opened holder 1 is shown in a perspective view to better illustrate the location of each of the components including battery connectors 5 and 6.

The preferred and optimumly preferred embodiments of the present invention have been described herein and shown in the accompanying drawings to illustrate the underlying principles of the invention but it is to be understood that numerous modifications and ramifications may be made without departing from the spirit and cope of this invention.

What is claimed is:

1. A holder for a battery which comprises a housing of two complemental compartments, each of said compartments forming one half of said housing, said compartments when abutting and adjacent each other having means to house one battery, each of said compartments movably connected to the other compartment by a hinge, each of said compartments having separate battery connectors, said connectors being a first and second connector, located internally in said compartments at a location adjacent said hinge.

2. The holder of claim 1 wherein said first battery connector is located at a position in said holder of 180° from the second connector when said holder is in an open mode.

3. The holder of claim 1 wherein said holder has on its outer surface means for attachment to a user.

4. The holder of claim 1 wherein said holder has said complementary compartments movably positioned on said hinge, wherein when said compartments are moved together they form a complete housing for said battery.

5. The holder of claim 1 wherein said compartments when folded together form an internal space which is said housing.

6. The holder of claim 1 wherein the dimensions of said battery are substantially equal to the dimensions of said housing.

7. A battery holder comprising in cooperation two compartments movably connected by a hinge, said compartments when placed together forming a battery housing, each of said compartments being an integral part of said housing, each of said compartments containing a separate battery connector at a terminal compartment location of said compartments which is adjacent said hinge, said connectors being a first and second connector, said housing having means to contain and house only one battery.

8. The holder of claim 7 wherein said first battery connector is located at a position in said holder of 180° from the second connector when said holder is in an open mode.

9. The holder of claim 7 wherein said holder has on its outer surface means for attachment to a user.

10. The holder of claim 7 wherein said holder has said complementary compartments movably positioned on said hinge, wherein when said compartments are moved together they form a complete housing for said battery.

11. The holder of claim 7 wherein said compartments when folded together form an internal space which is said housing.

12. The holder of claim 7 wherein the dimensions of said battery are substantially equal to the dimensions of said housing.

13. A process for providing continuous and uninterrupted battery power to a power-reliant structure which comprises placing a first battery into a housing of a battery holder comprising two movable compartments connected by a hinge, said two compartments when abutting each other forming said housing, using said first battery until its capacity is diminished, opening said housing so the two movable compartments are separated from each other, placing a new second battery in one of said compartments so that said battery makes contact with a connector in said one of said compartments while at the same time retaining said first battery in a compartment not occupied by said new second battery, subsequently removing said first battery from said housing and closing said housing by placing each of said movable compartments adjacent to and abutting each other.

* * * * *